United States Patent
Burton

(10) Patent No.: US 7,311,974 B1
(45) Date of Patent: Dec. 25, 2007

(54) CONCRETE FLOOR FINISHING SYSTEM AND METHOD

(76) Inventor: Rodney Burton, 1416 Pope Pl., Lutz, FL (US) 33549

( * ) Notice: Subject to any disclaimer, the term of this patent is extended or adjusted under 35 U.S.C. 154(b) by 436 days.

(21) Appl. No.: 11/061,154

(22) Filed: Feb. 18, 2005

(51) Int. Cl.
*B32B 13/00* (2006.01)
*B32B 27/06* (2006.01)
*B32B 27/38* (2006.01)
*B32B 27/40* (2006.01)
*B05D 1/38* (2006.01)
*C08L 63/00* (2006.01)

(52) U.S. Cl. ............ 428/414; 428/413; 428/423.1; 428/542.2; 428/543; 428/913.3; 427/402; 427/403; 427/407.1; 427/445

(58) Field of Classification Search ............. 428/413, 428/414, 423.1, 688, 542.2, 542.6, 543, 913.3; 427/180, 202, 203, 402, 403, 407.1, 445
See application file for complete search history.

(56) References Cited

U.S. PATENT DOCUMENTS

| | | | | |
|---|---|---|---|---|
| 3,772,051 A | * | 11/1973 | Shearing | 427/198 |
| 4,859,504 A | * | 8/1989 | Rossiter et al. | 427/262 |
| 4,959,250 A | * | 9/1990 | McKinnon | 428/15 |
| 5,248,338 A | * | 9/1993 | Price | 106/712 |

* cited by examiner

*Primary Examiner*—Michael J Feely
(74) *Attorney, Agent, or Firm*—Edward P Dutkiewicz P.A.

(57) ABSTRACT

An initial surface is provided. An overlay of colored grout is provided. The colored grout is on the initial surface. In this manner an intermediate surface is created. An acid stain is provided. The acid stain is on the intermediate surface. A two part clear epoxy resin is provided. The epoxy resin is provided on the intermediate surface. In this manner an exterior surface is created.

4 Claims, 2 Drawing Sheets

CONCRETE FLOOR FINISHING SYSTEM AND METHOD

BACKGROUND OF THE INVENTION

1. Field of the Invention

The present invention relates to a concrete floor finishing system and method and more particularly pertains to creating an elegant, care free floor in a safe and convenient manner.

2. Description of the Prior Art

The use of finishing processes of known designs and configurations is known in the prior art. More specifically, finishing processes of known designs and configurations previously devised and utilized for the purpose of xfxold are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,341,396 issued Sep. 12, 1967 to Iverson relates to a marbleizing process and article. U.S. Pat. No. 4,859,504 issued Aug. 22, 1989 to Rossiter relates to a concrete finishing process. U.S. Pat. No. 4,959,250 issued Sep. 25, 1990 to McKinnon relates to simulated marble. Lastly, U.S. Pat. No. 5,248,338 issued Sep. 28, 1993 to Price relates to a colored marble concrete and method of producing same.

While these devices fulfill their respective, particular objectives and requirements, the aforementioned patents do not describe concrete floor finishing system and method that allows creating an elegant, care free floor in a safe and convenient manner.

In this respect, the concrete floor finishing system and method according to the present invention substantially departs from the conventional concepts and designs of the prior art, and in doing so provides an apparatus primarily developed for the purpose of creating an elegant, care free floor in a safe and convenient manner.

Therefore, it can be appreciated that there exists a continuing need for a new and improved concrete floor finishing system and method which can be used for creating an elegant, care free floor in a safe and convenient manner. In this regard, the present invention substantially fulfills this need.

SUMMARY OF THE INVENTION

In view of the foregoing disadvantages inherent in the known types of finishing processes of known designs and configurations now present in the prior art, the present invention provides an improved concrete floor finishing system and method. As such, the general purpose of the present invention, which will be described subsequently in greater detail, is to provide a new and improved concrete floor finishing system and method and method which has all the advantages of the prior art and none of the disadvantages.

To attain this, the present invention essentially comprises a floor. The floor has a concrete, substantially horizontal initial surface.

An overlay of colored grout is provided. The colored grout is provided on the initial surface. The colored grout is applied by hand troweling. In this manner character is added and a substantially horizontal intermediate surface is created. The colored grout of the intermediate surface is allowed to dry. The colored grout is then ground substantially abating any and all high spots of the dried intermediate surface.

Provided next is an acid stain. The acid stain is provided on the dried and ground intermediate surface. The acid stain is neutralized.

Further provided is a two part clear epoxy resin. The epoxy resin is applied to the neutralized intermediate surface. In this manner depth is provided and an exterior surface is created.

Provided last is an optional coat of a clear aliphatic urethane. The urethane is provided on the exterior surface. In this manner the hardness and durability are increased and a final surface is created.

The present invention, in addition to the floor system as described herein, also includes the method for creating the floor system as described herein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved concrete floor finishing system and method which has all of the advantages of the prior art finishing processes of known designs and configurations and none of the disadvantages.

It is another object of the present invention to provide a new and improved concrete floor finishing system and method which may be easily and efficiently manufactured and marketed.

It is further object of the present invention to provide a new and improved concrete floor finishing system and method which is of durable and reliable constructions.

An even further object of the present invention is to provide a new and improved concrete floor finishing system and method which is susceptible of a low cost of manufacture with regard to both materials and labor, and which accordingly is then susceptible of low prices of sale to the consuming public, thereby making such concrete floor finishing system and method economically available to the buying public.

Even still another object of the present invention is to provide a concrete floor finishing system and method for creating an elegant, care free floor in a safe and convenient manner.

Lastly, it is an object of the present invention to provide a new and improved concrete floor finishing system and method. An initial surface is provided. An overlay of colored grout is provided. The colored grout is on the initial surface. In this manner an intermediate surface is created. An acid stain is provided. The acid stain is on the intermediate surface. A two part clear epoxy resin is provided. The epoxy resin is provided on the intermediate surface. In this manner an exterior surface is created.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
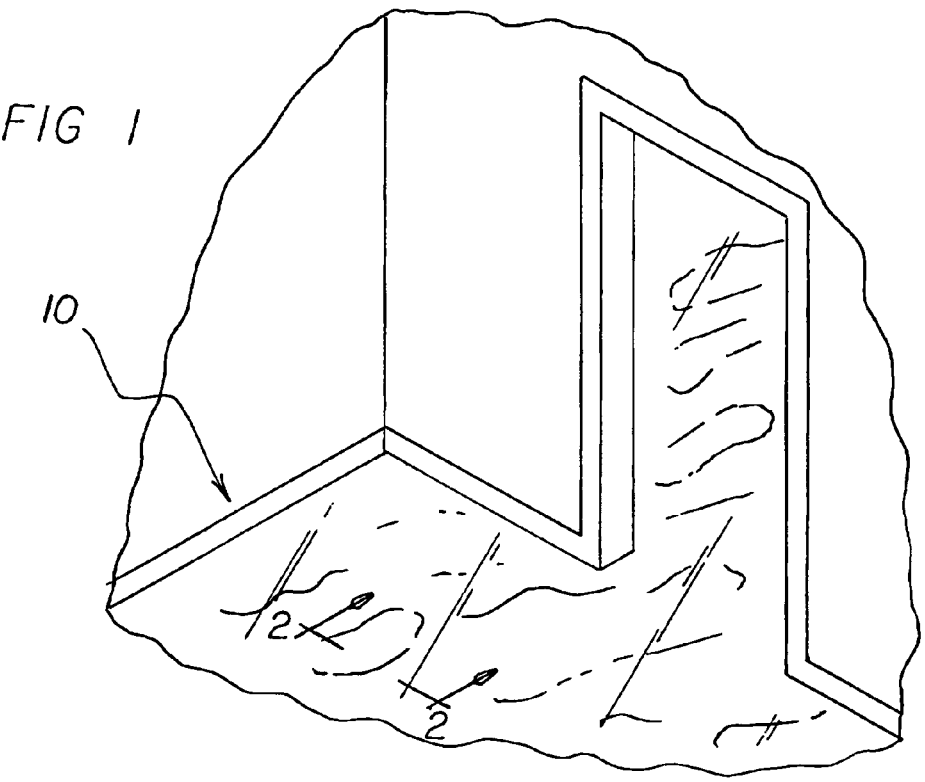
FIG. 1 is a perspective illustration of a concrete floor finishing system constructed inb accordance with the principles of the present invention.
Figure 2:
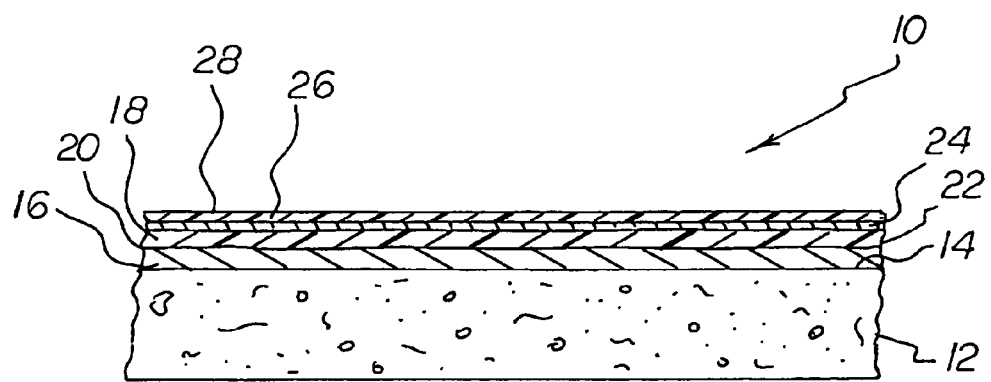
FIG. 2 is a cross sectional view taken along line 2-2 of FIG. 1.
Figure 3:
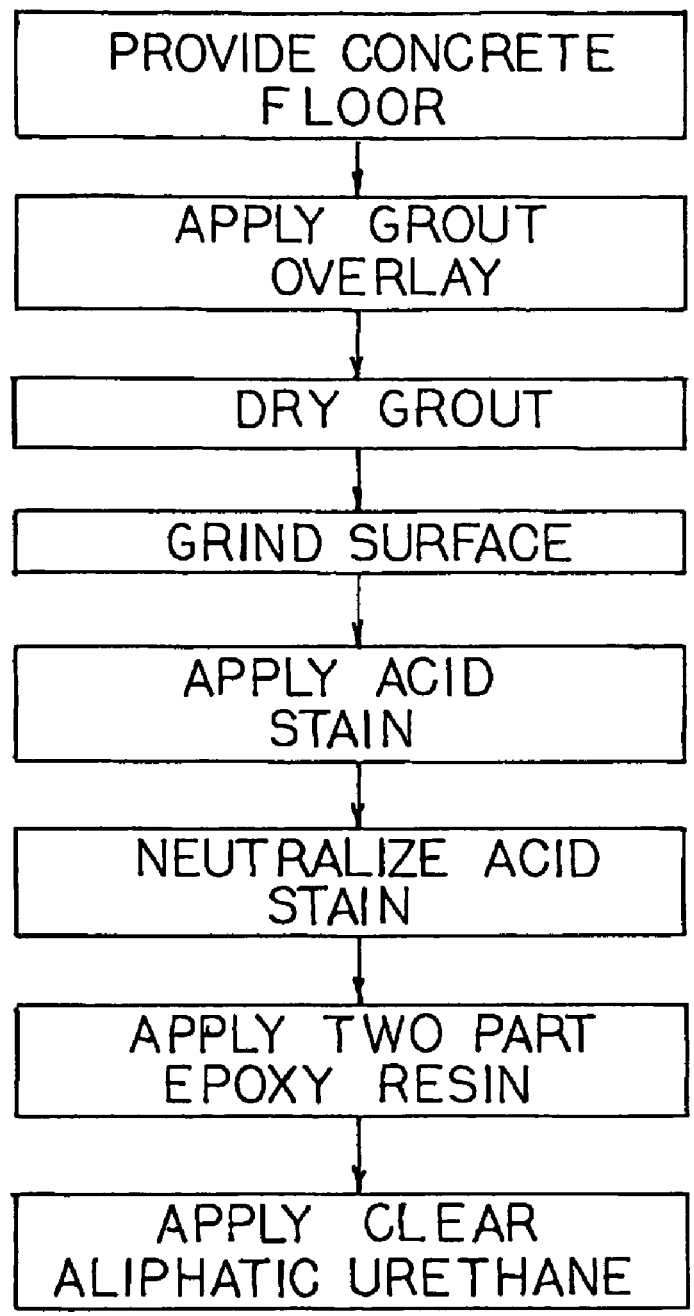
FIG. 3 is a flow diagram of the method steps for performing the method of the present invention.

With reference now to the drawings, and in particular to FIG. 1 thereof, the preferred embodiment of the new and improved concrete floor finishing system and method embodying the principles and concepts of the present invention and generally designated by the reference numeral 10 will be described.

The present invention, the concrete floor finishing system and method 10 is comprised of a plurality of components. Such components in their broadest context include an initial surface, an overlay of colored grout, an acid stain and a two part clear epoxy resin. Such components are individually configured and correlated with respect to each other so as to attain the desired objective.

First provided in the floor system of the present invention is a floor 12. The floor has a concrete, substantially horizontal initial surface 14.

An overlay of colored grout 16 is provided. The colored grout is provided on the initial surface. The colored grout is applied by hand troweling. In this manner character is added and a substantially horizontal intermediate surface 18 is created. The colored grout of the intermediate surface is allowed to dry. The colored grout is then ground substantially abating any and all high spots of the dried intermediate surface.

Provided next is an acid stain 20. The acid stain is provided on the dried and ground intermediate surface. The acid stain is neutralized.

Further provided is a two part clear epoxy resin 22. The epoxy resin is applied to the neutralized intermediate surface. In this manner depth is provided and an exterior surface 24 is created.

Provided last is an optional coat of a clear aliphatic urethane 26. The urethane is provided on the exterior surface. In this manner the hardness and durability are increased and a final surface 28 is created.

In addition to the system as described above, the present invention also includes the method of creating an elegant, care free floor in a safe and convenient manner comprising.

The first step in the method of the present invention is providing a floor with a concrete, substantially horizontal initial surface.

The second step is applying an overlay of colored grout onto the initial surface. The colored grout is applied by hand troweling. In this manner character is added and a substantially horizontal intermediate surface is created.

The third step is allowing the colored grout of the intermediate surface to dry.

The fourth step is grinding substantially any and all high spots of the dried intermediate surface.

The fifth step is applying an acid stain to the dried and ground intermediate surface.

The sixth step is neutralizing the acid stain of the dried and ground intermediate surface.

The seventh step is applying a two part clear epoxy resin to the neutralized intermediate surface. In this manner depth is provided and an exterior surface is created.

The last step is applying an optional coat of a clear aliphatic urethane. The urethane is applied on the exterior surface. In this manner the hardness and durability are increased and, if desired, a final surface is created.

Prior to the present invention, acid stained floors have been normally sealed with polyurethane. Such finish is pleasing to the eye until it is subjected to wear. Polyurethane is very susceptible to wear. To protect polyurethane top coats, sacrificial top coats of wax are normally utilized. Such surfaces of wax normally require constant care, buffing and polishing and occasional stripping with re-waxing. Scuff marks are an on-going problem. The sealer of the present invention is the toughest on the market. No waxing is ever needed. The floor stays gorgeous with just an occasional damp mop or the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A finishing system comprising:
    an initial surface fabricated of concrete and having a substantially horizontal initial surface;
    an overlay of colored grout on the initial surface to create an intermediate surface;
    an acid stain on the intermediate surface; and
    a two part clear epoxy resin on the intermediate surface to create an exterior surface.

2. The system as set forth in claim 1 and further including an optional coat of a clear aliphatic urethane on the exterior surface for increasing the hardness and durability and to create a final surface if desired.

3. A concrete floor finishing system for creating an elegant, care free floor in a safe and convenient manner comprising, in combination:
    a floor with a concrete, substantially horizontal initial surface;
    an overlay of colored grout on the initial surface applied by hand troweling in order to add character and create a substantially horizontal intermediate surface, the colored grout of the intermediate surface being allowed to dry and then ground substantially abating any and all high spots of the dried intermediate surface;
    an acid stain on the dried and ground intermediate surface, the acid stain being neutralized;
    a two part clear epoxy resin applied to the neutralized intermediate surface to provide depth and create an exterior surface; and
    an optional coat of a clear aliphatic urethane on the exterior surface for increasing the hardness and durability and to create a final surface.

4. A concrete floor finishing method for creating an elegant, care free floor in a safe and convenient manner comprising, in combination:
    providing a floor with a concrete, substantially horizontal initial surface;
    applying an overlay of colored grout onto the initial surface by hand troweling in order to add character and create a substantially horizontal intermediate surface;
    allowing the colored grout of the intermediate surface to dry;
    grinding substantially any and all high spots of the dried intermediate surface;
    applying an acid stain to the dried and ground intermediate surface;
    neutralizing the acid stain of the dried and ground intermediate surface;
    applying a two part clear epoxy resin to the neutralized intermediate surface to provide depth and create an exterior surface; and
    applying an optional coat of a clear aliphatic urethane on the exterior surface for increasing the hardness and durability and to create a final surface if desired.

* * * * *